(12) United States Patent
Djordjevic et al.

(10) Patent No.: US 8,385,439 B2
(45) Date of Patent: Feb. 26, 2013

(54) POLARIZATION MODE DISPERSION COMPENSATION IN MULTILEVEL CODED-MODULATION SCHEMES USING BLAST ALGORITHM AND ITERATIVE POLARIZATION CANCELLATION

(75) Inventors: Ivan B. Djordjevic, Tucson, AZ (US); Lei Xu, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1038 days.

(21) Appl. No.: 12/392,294

(22) Filed: Feb. 25, 2009

(65) Prior Publication Data

US 2009/0297144 A1  Dec. 3, 2009

Related U.S. Application Data

(60) Provisional application No. 61/056,239, filed on May 27, 2008.

(51) Int. Cl.
*H04K 1/10* (2006.01)
*H04K 3/00* (2006.01)
*H04B 10/06* (2006.01)

(52) U.S. Cl. .................... 375/260; 398/39; 398/202

(58) Field of Classification Search .......... 375/262, 375/265, 267, 142–144, 233, 260, 316, 150, 375/152, 299, 343, 346–347, 350; 700/53; 455/101, 132–141; 714/755, 801, 795
See application file for complete search history.

(56) References Cited

U.S. PATENT DOCUMENTS

| | | | | |
|---|---|---|---|---|
| 7,317,770 | B2 * | 1/2008 | Wang | 375/340 |
| 7,391,827 | B2 * | 6/2008 | Kusume | 375/340 |
| 7,623,797 | B2 * | 11/2009 | Crivelli et al. | 398/208 |
| 7,734,990 | B2 * | 6/2010 | Maru | 714/780 |
| 7,760,828 | B2 * | 7/2010 | Visoz et al. | 375/350 |
| 7,986,752 | B2 * | 7/2011 | Nikopour-Deilami et al. | 375/341 |
| 7,992,070 | B2 * | 8/2011 | Djordjevic et al. | 714/755 |
| 8,054,904 | B2 * | 11/2011 | Hwang et al. | 375/267 |
| 8,060,811 | B2 * | 11/2011 | Shabany et al. | 714/794 |
| 2006/0285531 | A1 * | 12/2006 | Howard et al. | 370/343 |
| 2007/0116143 | A1 * | 5/2007 | Bjerke et al. | 375/262 |
| 2008/0107196 | A1 * | 5/2008 | Won | 375/260 |

(Continued)

OTHER PUBLICATIONS

"Layers Space-Time Architecture for Wireless Communications in a Fading Environment When Using Multi-Element Antennas", Bell Labs Technical Journal, Autumn 1996, pp. 41-59.*

(Continued)

*Primary Examiner* — David C. Payne
*Assistant Examiner* — Bahman Badipour
(74) *Attorney, Agent, or Firm* — Joseph Kolodka; James Bitetto

(57) ABSTRACT

Receivers and methods are provided for polarization mode dispersion compensation in multi-level coded-modulation schemes using a BLAST algorithm and iterative polarization cancellation. A receiver includes a vertical Bell Laboratories Layered Space-Time Architecture (V-BLAST) orthogonal frequency division multiplexing (OFDM) detector configured to receive input sequences and partially cancel polarization interference with respect to the input sequences to output symbol estimates for the input sequences. The receiver further includes one or more low-density parity-check (LDPC) decoders coupled to the V-BLAST OFDM detector configured to receive channel bit reliabilities and output code words. The channel bit reliabilities are indirectly calculated from the symbol estimates. The one or more LDPC decoders iteratively provide extrinsic soft information feedback to the V-BLAST OFDM detector to compensate for the polarization interference.

28 Claims, 10 Drawing Sheets

U.S. PATENT DOCUMENTS

| | | | | |
|---|---|---|---|---|
| 2008/0256426 | A1* | 10/2008 | Reid et al. | 714/801 |
| 2008/0310554 | A1* | 12/2008 | Siti et al. | 375/340 |
| 2009/0154599 | A1* | 6/2009 | Siti et al. | 375/320 |
| 2010/0202573 | A1* | 8/2010 | Su | 375/341 |
| 2011/0096858 | A1* | 4/2011 | Klimer | 375/267 |
| 2011/0110449 | A1* | 5/2011 | Ramprashad et al. | 375/261 |
| 2011/0310951 | A1* | 12/2011 | Cvijetic et al. | 375/233 |

OTHER PUBLICATIONS

"Multiple Antenna Systems: Frontier of Wireless Access", IEEE 2004, pp. 930-934.*

W. Shieh et al., Theoretical and experimental study on PMDsupported transmission using polarization diversity in coherent optical OFDM systems, Aug. 6, 2007, Optical Express, vol. 15 , No. 16, 9936-9946.*

Ezio Biglieri, Decoding Space-Time Codes With Blast Architectures, IEEE Transactions on Signal Processing, vol. 50, No. 10, Oct. 2002,2547-2552.*

Ben Lu et al., LDPC-Based Space-Time Coded OFDM Systems Over Correlated Fading Channels: Performance Analysis and Receiver Design, IEEE Transactions on Communications, vol. 50, No. 1, Jan. 2002,74-88.*

Ezio Biglieri et al., Suboptimum Receiver Interfaces and Space-Time Codes, IEEE Transactions on Signal Processing, vol. 51, No. 11, Nov. 2003, 2720-2728.*

Ezio Biglieri et al., Doubly-Iterative Decoding of Space-Time Turbo Codes with a Large Number of Antennas, IEEE 2004, 442-447.*

Ezio Biglieri et al., Suboptimum Receiver Interfaces for Coded Multiple-Antenna Systems, IEEE 2003,2658-2662.*

Polarisation mode dispersion mitigation in coherent optical orthogonal frequency division multiplexed systems, Electronics Letters Aug. 17, 2006 vol. 42 No. 17.*

Foschini, G. Layered Space-Time Architecture for Wireless Communication in a Fading Environment When Using Multi-Element Antennas. Bell Labs Technical Journal. vol. 2, No. 2. 1996. pp. 41-59.

Minkov, L, et al. Demonstration of PMD Compensation by LDPC-Coded Turbo Equalization and Channel Capacity Loss Characterization Due to PMD and Quantization. IEEE Photonics Technology Letters. vol. 19, No. 22. Nov. 2007. pp. 1852-1854.

Savory, S. Digital Filters for Coherent Optical Receivers. OSA Optics Express. vol. 16, No. 2. Jan. 2008. pp. 804-817.

Shieh, W., et al. Theoretical and Experimental Study on PMD-Supported Transmission Using Polarization Diversity in Coherent Optical OFDM Systems. OSA Optics Express. vol. 15, No. 16. pp. 9936-9947, 2007.

* cited by examiner

US 8,385,439 B2

POLARIZATION MODE DISPERSION COMPENSATION IN MULTILEVEL CODED-MODULATION SCHEMES USING BLAST ALGORITHM AND ITERATIVE POLARIZATION CANCELLATION

RELATED APPLICATION INFORMATION

This application claims priority to provisional application Ser. No. 61/056,239 filed on May 27, 2008, incorporated herein by reference.

BACKGROUND

1. Technical Field

The present invention relates to optical communications, and more particularly to polarization mode dispersion (PMD) compensation in multilevel coded-modulation schemes using a BLAST algorithm and iterative polarization cancellation.

2. Description of the Related Art

The bit-error ratio (BER) performance of fiber-optic communication systems operating at high data rates is degraded by intra-channel and inter-channel fiber nonlinearities, polarization mode dispersion (PMD), and chromatic dispersion. In order to overcome those challenges, novel advanced techniques and devices in modulation and detection, coding and signal processing are required.

These and other drawbacks and disadvantages of the prior art are addressed by the present principles, which are directed to polarization mode dispersion (PMD) compensation in multilevel coded-modulation schemes using a BLAST algorithm and iterative polarization cancellation.

According to an aspect of the present principles, there is provided a receiver. The receiver includes a vertical Bell Laboratories Layered Space-Time Architecture (V-BLAST) orthogonal frequency division multiplexing (OFDM) detector configured to receive input sequences and partially cancel polarization interference with respect to the input sequences to output symbol estimates for the input sequences. The receiver further includes one or more low-density parity-check (LDPC) decoders coupled to the V-BLAST OFDM detector configured to receive channel bit reliabilities and output code words. The channel bit reliabilities are indirectly calculated from the symbol estimates. The one or more LDPC decoders iteratively provide extrinsic soft information feedback to the V-BLAST OFDM detector to compensate for the polarization interference.

According to another aspect of the present principles, there is provided a receiver. The receiver includes an iterative detector configured to receive input sequences and iteratively and partially cancel polarization interference with respect to the input sequences to output symbol estimates for the input sequences. The receiver further includes one or more low-density parity-check (LDPC) decoders coupled to the iterative detector configured to receive channel bit probabilities from the iterative detector and output code words. The channel bit reliabilities are indirectly calculated from the symbol estimates. The one or more LDPC decoders iteratively provide extrinsic soft information feedback to the iterative detector to compensate for the polarization interference.

According to yet another aspect of the present principles, there is provided a method. The method includes receiving and sampling an input signal using a sampler. The method further includes partially cancelling polarization interference using a vertical Bell Laboratories Layered Space-Time Architecture (V-BLAST) orthogonal frequency division multiplexing (OFDM) detector configured to receive channel samples of the input signal and provide symbol estimates. The method also includes decoding the input signal based on channel bit reliabilities to output code words using one or more low-density parity-check (LDPC) decoders. The channel bit reliabilities are indirectly calculated from the symbol estimates. The method additionally includes iteratively feeding back extrinsic soft information to the V-BLAST OFDM detector to compensate for the polarization interference.

According to still another aspect of the present principles, there is provided a method. The method includes receiving and sampling an input signal using a sampler. The method further includes partially cancelling polarization interference using an iterative detector configured to receive channel samples of the input signal and provide symbol estimates. The method also includes decoding the input signal based on channel bit reliabilities to output code words using one or more low-density parity-check (LDPC) decoders. The channel bit reliabilities are indirectly calculated from the symbol estimates. The method additionally includes iteratively feeding back extrinsic soft information to the iterative detector to compensate for the polarization interference.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
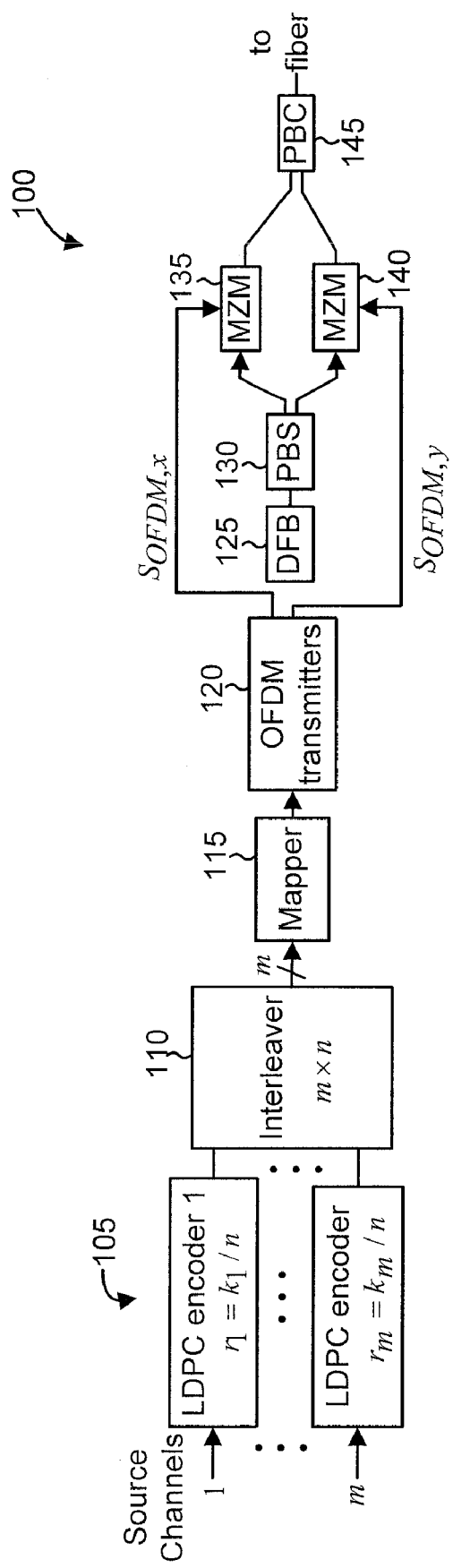
FIG. 1 is a block diagram showing a transmitter in accordance with an embodiment of the present principles.

Referring now in detail to the figures in which like numerals represent the same or similar elements and initially to FIG. 1, a transmitter 100 in accordance with an embodiment of the present principles is shown. The transmitter 100 includes a series (1 through m) of low-density parity-check (LDPC) encoders 105, an interleaver 110, a mapper 115, orthogonal frequency division multiplexing (OFDM) transmitters 120, a distributed feedback (DFB) laser 125, a polarizing beam splitter (PBS) 130, a first Mach-Zehnder modulator (MZM) or equivalent intensity modulator 135, a second Mach-Zehnder modulator (MZM) or equivalent intensity modulator 140, and a polarization beam combiner (PBC) 145.

Figure 2:
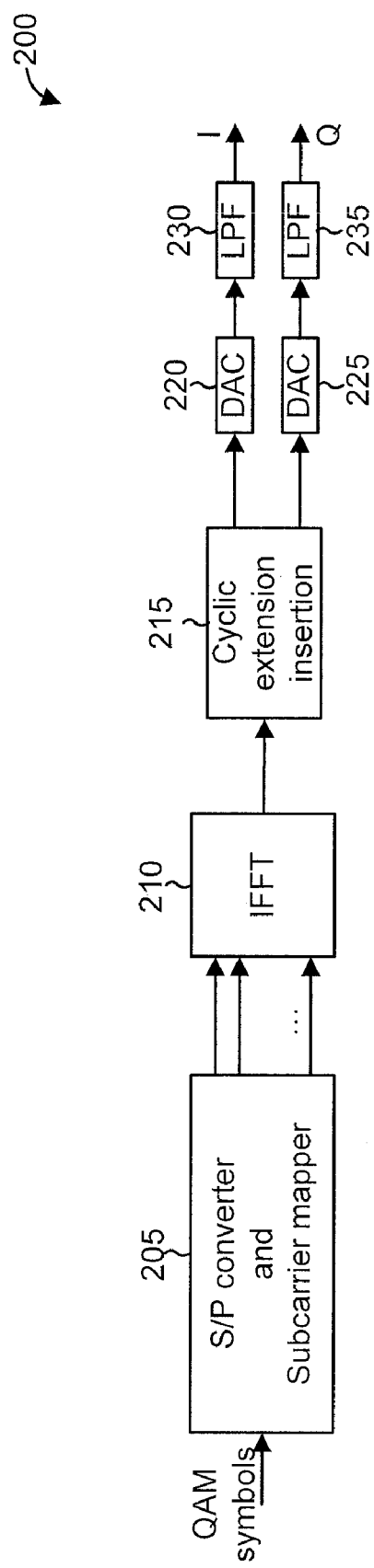
FIG. 2 is a block diagram showing an OFDM transmitter in accordance with an embodiment of the present principles.

FIG. 2 shows an OFDM transmitter 200 in accordance with an embodiment of the present principles. The OFDM transmitter 200 includes a serial to parallel (S/P) converter and subcarrier mapper 205, an inverse fast Fourier transform (IFFT) module 210, a cyclic extension insertion module 215, a first digital to analog converter (DAC) 220, a second DAC 225, a first low pass filter (LPF) 230, and a second LPF 235.

Figure 3:
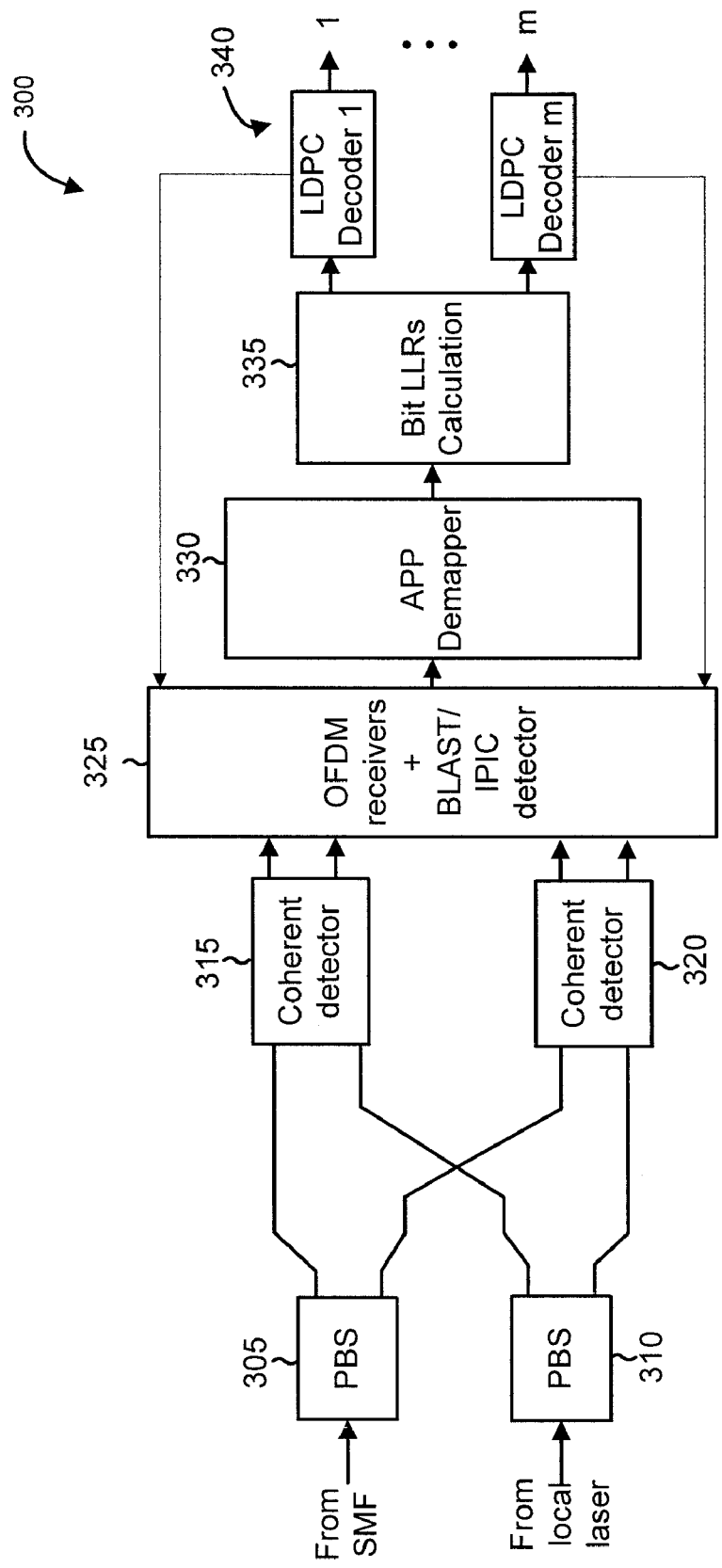
FIG. 3 is a block diagram showing a receiver in accordance with an embodiment of the present principles.

FIG. 3 shows a receiver 300 in accordance with an embodiment of the present principles. The receiver 300 includes a first polarizing beam splitter (PBS) 305, a second PBS 310, a first coherent detector 315, a second coherent detector 320, an OFDM receivers and BLAST/IPIC detector module 325, an a posteriori probability (APP) demapper 330, a bit log-likelihood ratio (LLR) calculation module 335, and a series (1 through m) of LDPC decoders 340.

Figure 4:
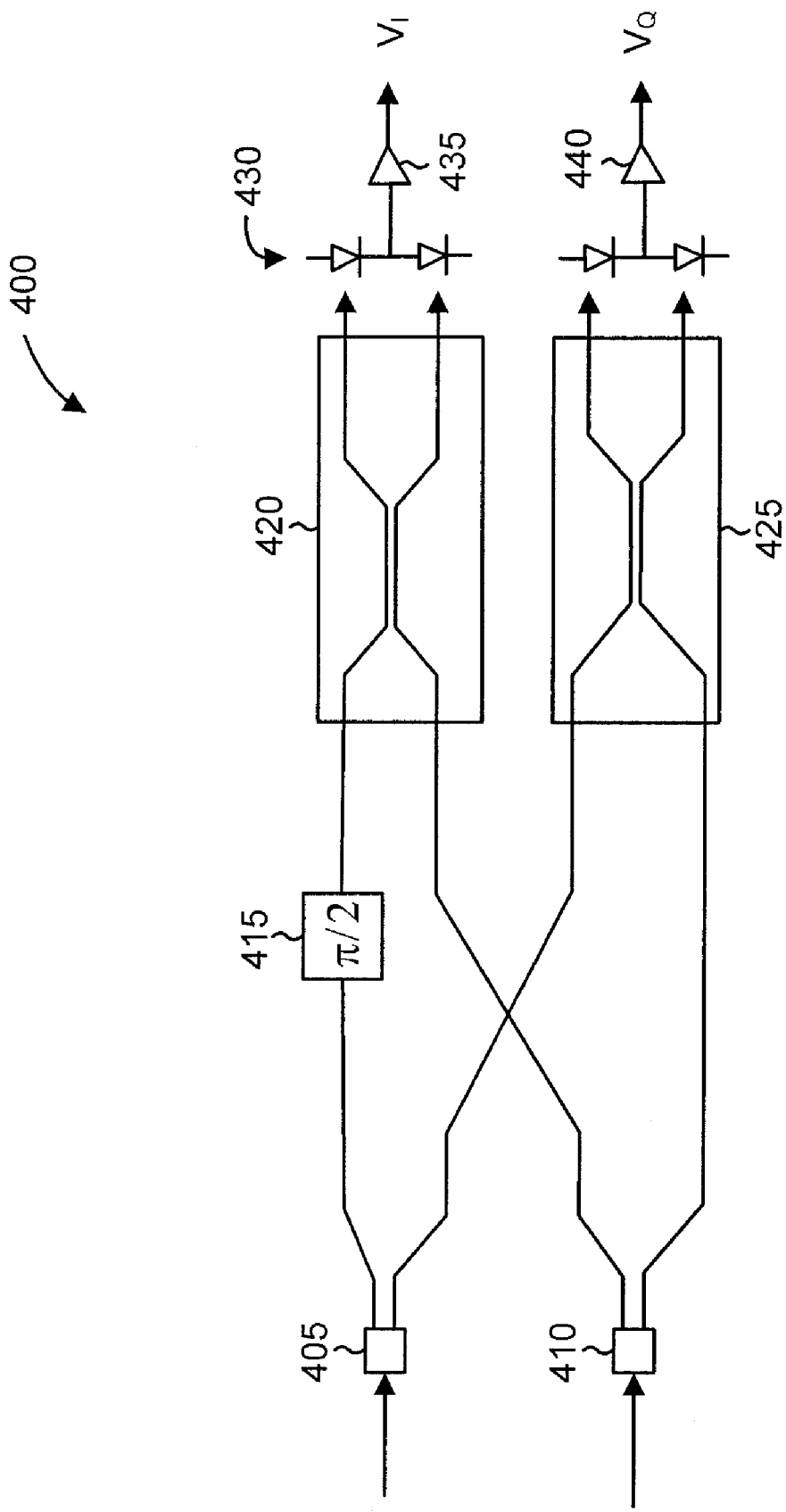
FIG. 4 is a block diagram showing a coherent detector in accordance with an embodiment of the present principles.

FIG. 4 shows a coherent detector 400 in accordance with an embodiment of the present principles. The coherent detector 400 includes a first 3 dB coupler (splitter, Y-junction) 405, a second 3 dB coupler (splitter, Y-junction) 410, a phase shifter (n/2) 415, an upper directional coupler 420, a lower directional coupler 425, two balanced photo detectors 430, a first trans-impedance amplifier (TA) 435, and a second TA.

Figure 5:
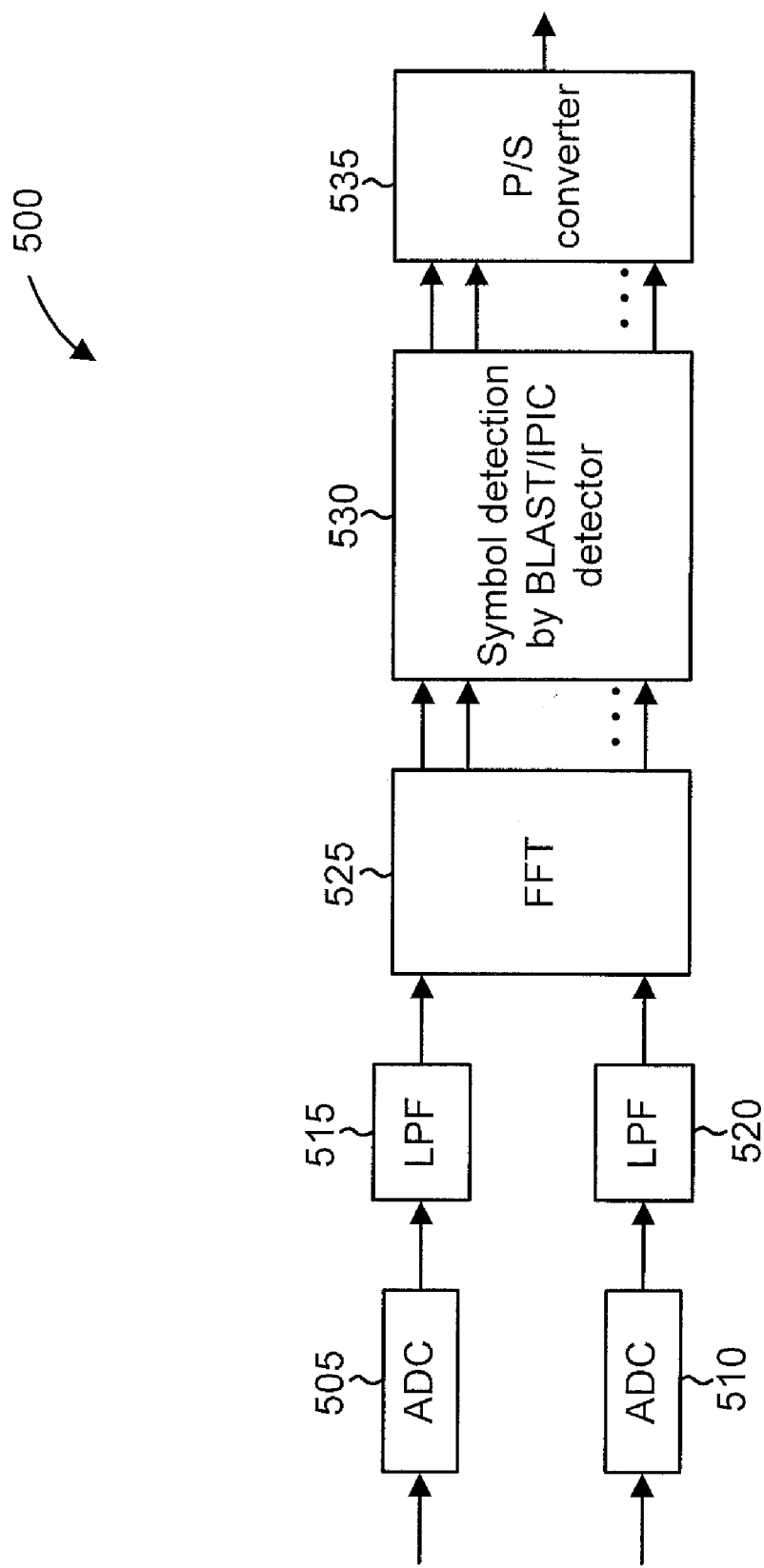
FIG. 5 is a block diagram showing an OFDM receiver with symbol detector in accordance with an embodiment of the present principles.

FIG. 5 shows an OFDM receiver 500 in accordance with an embodiment of the present principles. The OFDM receiver 500 includes a first analog to digital converter (ADC) 505, a second ADC 510, a first low pass filter (LPF) 515, a second LPF 520, a fast Fourier transform module 525, a symbol detection by BLAST/IPIC detector 530, and a parallel to serial (P/S) converter 535.

Elements of the transmitter 100, OFDM transmitter 200, receiver 300, coherent detector 400, and OFDM receiver 500 are described in further detail herein after with respect to various aspects of the present principles.

Figure 6A:
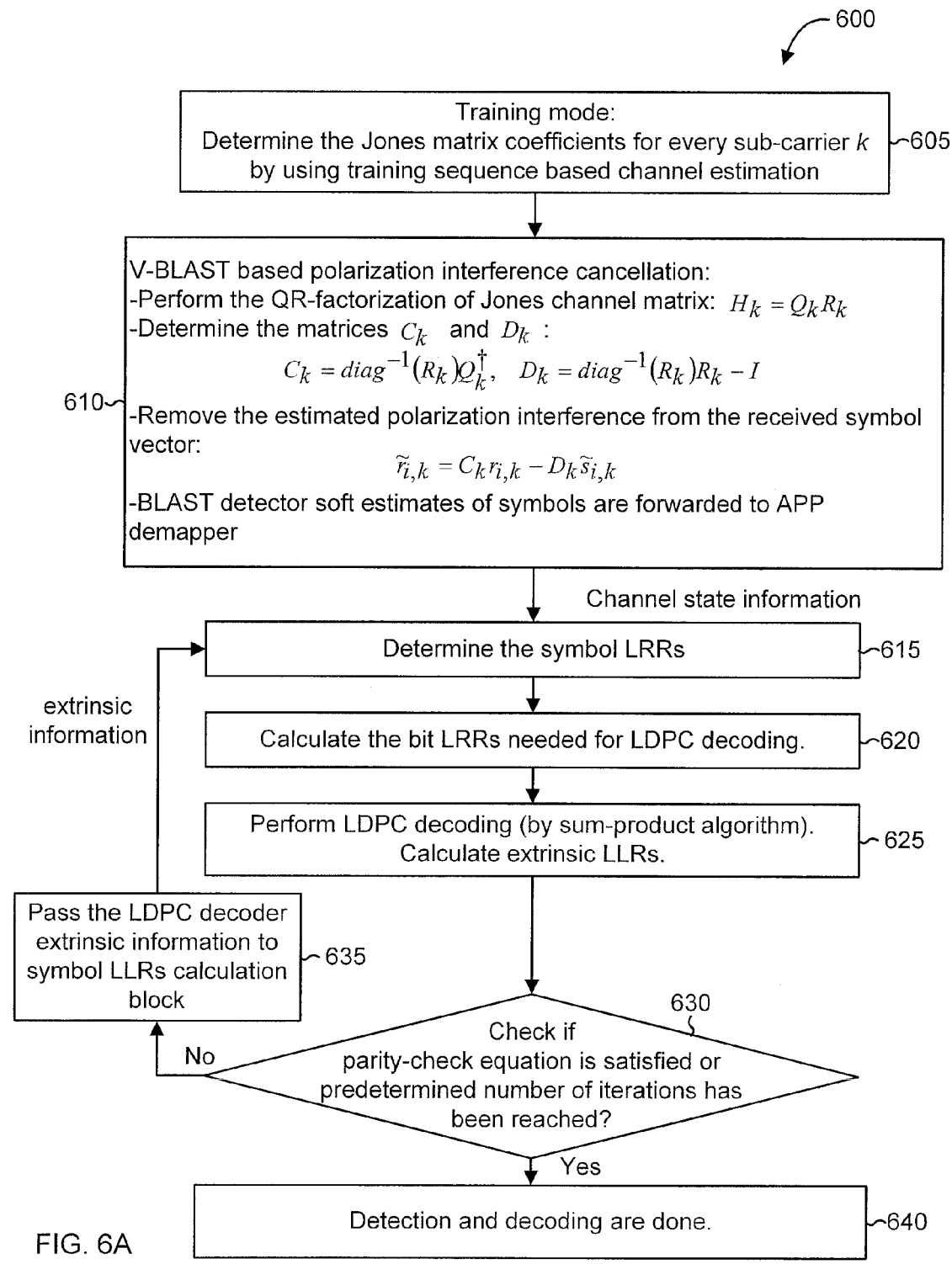
FIG. 6A is a flow diagram showing a zero forcing (ZF) V-BLAST based polarization interference cancellation method in accordance with an embodiment of the present principles.

FIG. 6A shows a zero forcing (ZF) V-BLAST based method 600 for polarization interference cancellation in accordance with an embodiment of the present principles.

At step 605, which corresponds to a training mode, the Jones matrix coefficients are determined for every sub-carrier k by using training sequence based channel estimation.

At step 610, V-BLAST-based polarization interference cancellation is performed. The V-BLAST-based polarization interference cancellation involves: performing the QR-factorization of Jones channel matrix $H_k=Q_kR_k$; determining the matrices $C_k$ and $D_k$, where $C_k=\text{diag}^{-1}(R_k)Q_k^\dagger$, and $D_k=\text{diag}^{-1}(R_k)R_k-I$; removing the estimated polarization interference from the received symbol vector $\tilde{r}_{i,k}=C_kr_{i,k}-D_k\tilde{s}_{i,k}$; and forwarding the BLAST detector soft estimates of symbols to the APP demapper 330.

At step 615, the symbol LLRs are determined by the APP demapper 330.

At step 620, the bit LLRs needed for LDPC decoding are calculated by the bit LLRs calculation module 335.

At step 625, LDPC decoding is performed by the series of LDPC decoders 255 using, for example, a sum-product algorithm, and extrinsic LLRs are calculated.

At step 630, it is determined whether or not a parity-check equation has been satisfied or whether a predetermined number of iterations has been reached.

If so, then at step 640 detection and decoding are concluded. Otherwise, control is passed to step 635.

At step 635, the LDPC decoder LLRs are passed into a symbol LLRs calculation module included in the APP demapper 330.

Figure 6B:
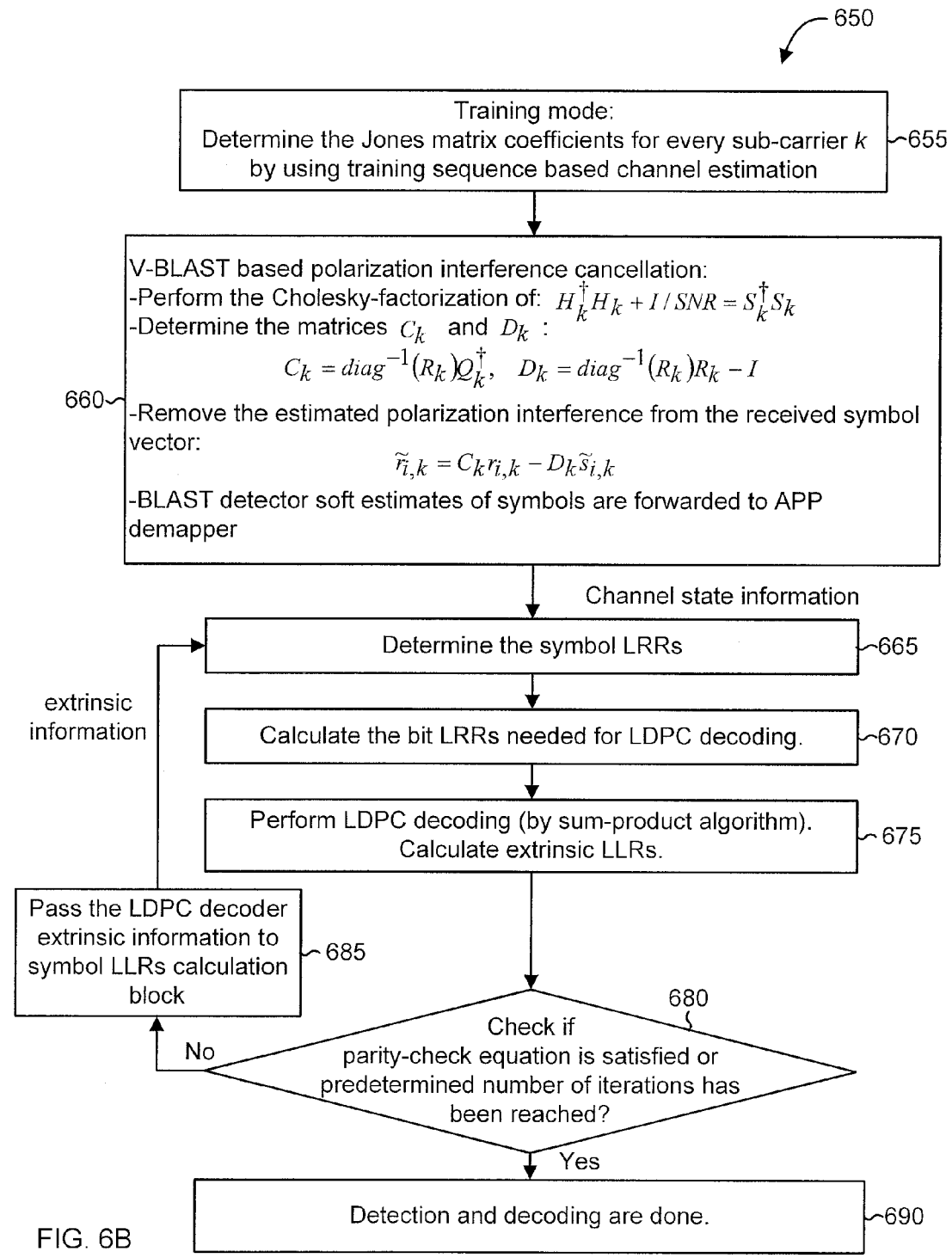
FIG. 6B is a flow diagram showing a minimum-mean-square-error (MMSE) V-BLAST based polarization interference cancellation method in accordance with an embodiment of the present principles.

FIG. 6B shows a minimum-mean-square-error (MMSE) V-BLAST based method 650 for polarization interference cancellation in accordance with an embodiment of the present principles.

At step 655, which corresponds to a training mode, the Jones matrix coefficients are determined for every sub-carrier k by using training sequence based channel estimation.

At step 660, V-BLAST-based polarization interference cancellation is performed. The V-BLAST-based polarization interference cancellation involves: performing the Cholesky-factorization of $H_k^\dagger H_k+I/SNR=S_k S_k$; determining the matrices $C_k$ and $D_k$, where $C_k=\text{diag}^{-1}(R_k)Q_k^\dagger$, and $D_k=\text{diag}^{-1}(R_k)R_k-I$; removing the estimated polarization interference from the received symbol vector $\tilde{r}_{i,k}=C_kr_{i,k}-D_k\tilde{s}_{i,k}$; and forwarding the BLAST detector soft estimates of symbols to the APP demapper 330.

At step 665, the symbol LLRs are determined by the APP demapper 330.

At step 670, the bit LLRs needed for LDPC decoding are calculated by the bit LLRs calculation module 335.

At step 675, LDPC decoding is performed by the series of LDPC decoders 255 using, for example, a sum-product algorithm, and extrinsic LLRs are calculated.

At step 680, it is determined whether or not a parity-check equation has been satisfied or whether a predetermined number of iterations has been reached.

If so, then at step 690 detection and decoding are concluded. Otherwise, control is passed to step 635.

At step 685, the LDPC decoder LLRs are passed into a symbol LLRs calculation module included in the APP demapper 330.

Figure 7:
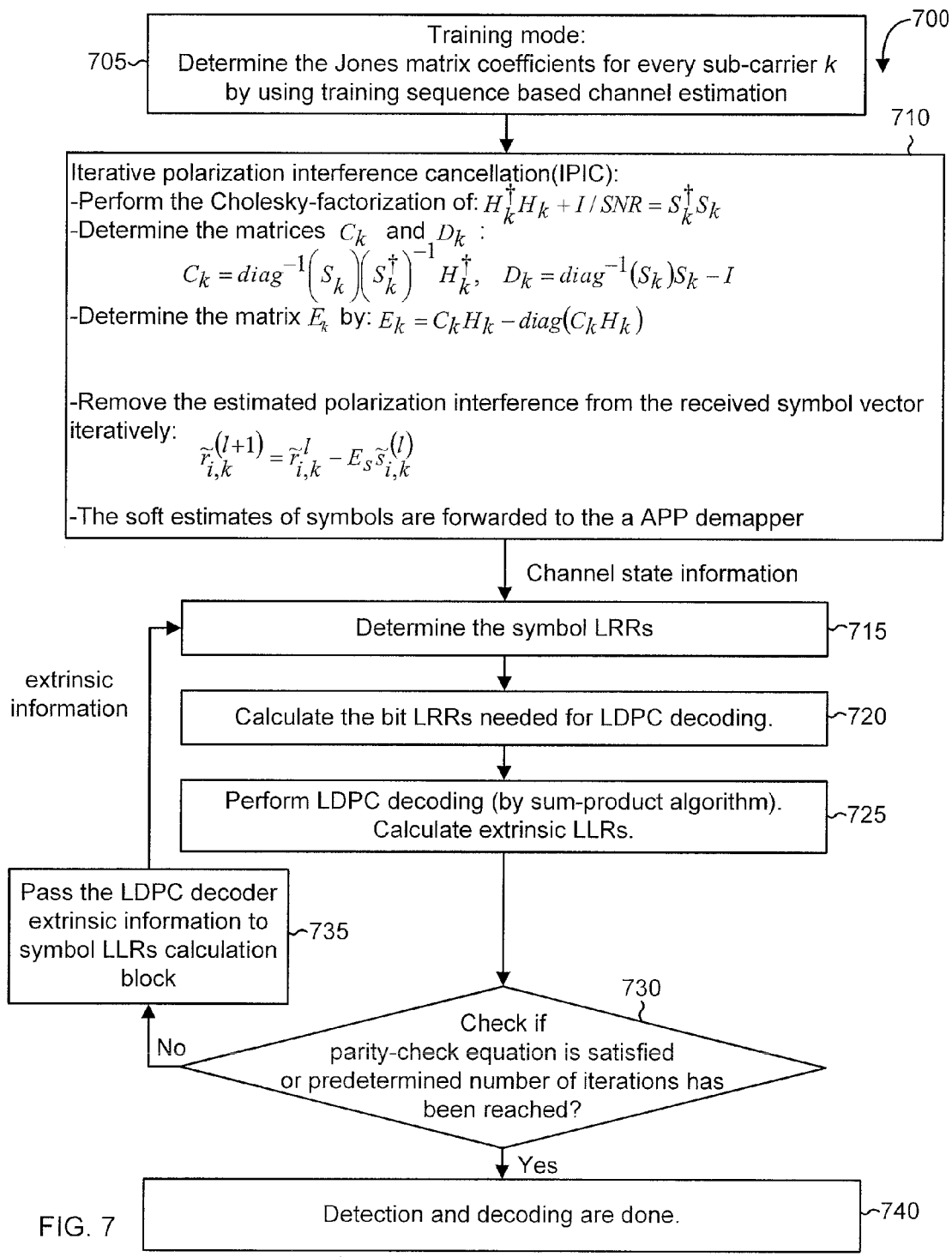
FIG. 7 is a flow diagram showing an iterative polarization interference cancellation (IPIC) method in accordance with an embodiment of the present principles.

FIG. 7 shows a method 700 for iterative polarization interference cancellation (IPIC) in accordance with an embodiment of the present principles.

At step 705, which corresponds to a training mode, the Jones matrix coefficients are determined for every sub-carrier k by using training sequence based channel estimation.

At step 710, iterative polarization interference cancellation (IPIC) is performed. The IPIC involves performing the Cholesky-factorization of $H_k^\dagger H_k+I/SNR=S_k S_k$; determining the matrices $C_k$ and $D_k$, where $C_k=\text{diag}^{-1}(S_k)(S_k^\dagger)^{-1}H_k$, and $D_k=\text{diag}^{-1}(S_k)S_k-I$; determining the matrix $E_k$ by $E_k=C_kH_k-\text{diag}(C_kH_k)$; removing the estimated polarization interference from the received symbol vector iteratively $\tilde{r}_{i,k}^{(l+1)}=\tilde{r}_{i,k}^{(l)}-E_k\tilde{s}_{i,k}^{(l)}$; and forward the soft estimates of symbols obtained by IPIC to the APP demapper 330.

At step 715, the symbol LLRs are determined by the APP demapper 330.

At step 720, the bit LLRs needed for LDPC decoding are calculated by the bit LLRs calculation module 335.

At step 725, LDPC decoding is performed by the series of LDPC decoders 255 using, for example, a sum-product algorithm, and extrinsic LLRs are calculated.

At step 730, it is determined whether or not a parity-check equation has been satisfied or whether a predetermined number of iterations has been reached.

If so, then at step 740 detection and decoding are concluded. Otherwise, control is passed to step 735.

At step 735, the LDPC decoder LLRs are passed into the symbol LLRs calculation module included in the APP demapper 330.

Steps of the methods 600 and 700 are described in further detail herein after with respect to various aspects of the present principles.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Herein, we propose two alternative schemes suitable for PMD compensation, which do not require an increase in complexity as differential group delay (DGD) increases. The proposed schemes are suitable for use in multilevel (41_2) block-coded modulation schemes with coherent detection. Both schemes use the LDPC codes as channel codes. The proposed PMD compensators employ coded-OFDM and coherent detection. When used in combination with girth-10 LDPC codes the proposed schemes outperform polarization-time coding based OFDM by 1 dB at BER of $10^{-9}$, and provide two times higher spectral efficiency. The proposed schemes perform comparable and are able to compensate even 1200 ps of differential group delay with negligible penalty.

The first scheme is based on a BLAST-type polarization-interference cancellation scheme, and the second scheme is based on iterative polarization cancellation. In further detail, the first scheme is based on Bell Laboratories layered space-time architecture (BLAST), originally proposed to deal with spatial interference in wireless communications. We consider two versions of this scheme: a zero-forcing vertical-BLAST scheme (ZF V-BLAST); and a minimum-mean-square-error vertical-BLAST (MMSE V-BLAST) scheme. Because the ZF V-BLAST scheme is derived by ignoring the influence of amplified spontaneous emission (ASE) noise, we propose the second scheme that uses the output of the ZF V-BLAST scheme as a starting point and removes the remaining polarization interference in an iterative fashion. This approach also leads to reducing the influence of ASE noise. We evaluate the performance of those schemes when used in combination with coherent detection based OFDM. We describe how to use those schemes together with multilevel modulation and forward error correction (FEC). The arbitrary FEC scheme can be used with the proposed PMD compensation schemes. However, the use of low-density parity-check (LDPC) codes leads to channel capacity achieving performance. The proposed schemes outperform the polarization-diversity OFDM scheme and polarization-time (PT)-based OFDM, in terms of both bit-error ratio (BER) and spectral efficiency.

A description will now be given of the proposed PMD compensation schemes in accordance with an embodiment of the present principles.

For the first-order PMD study, neglecting the polarization dependent loss and depolarization effects, the Jones matrix can be represented by the following:

$$H(\omega) = \begin{bmatrix} h_{xx}(\omega) & h_{xy}(\omega) \\ h_{yx}(\omega) & h_{yy}(\omega) \end{bmatrix} = R^{-1}P(\omega)R, \quad (1)$$

$$P(\omega) = \begin{bmatrix} e^{-j\omega\tau/2} & 0 \\ 0 & e^{j\omega\tau/2} \end{bmatrix},$$

where τ denotes the differential group delay (DGD) R=R(0,ε) is the rotational matrix (with 0 being the polar angle, and ε being the azimuth angle), and ω is the angular frequency. For OFDM with coherent detection, the received symbol vector of the kth subcarrier in the ith OFDM symbol $r_{i,k}=[r_{x,i,k}r_{y,i,k}]^T$ can be represented by the following:

$$r_{i,k}=H_k s_{i,k} e^{j[\phi_{CD}(k)+\phi_T-\phi_{LO}]}+n_{i,k}, \quad (2)$$

where $s_{i,k}=[s_{x,i,k}s_{y,i,k}]^T$ denotes the transmitted symbol vector of the kth subcarrier in the ith OFDM symbol, $n_{i,k}=[n_{x,i,k}n_{y,i,k}]^T$ denotes the noise vector dominantly determined by the amplified spontaneous emission (ASE) noise; $\phi_T$ and $\phi_{LO}$ respectively denote the laser phase noise processes of transmitting and local lasers, $\phi_{CD}(k)$ denotes the phase distortion of the kth subcarrier due to chromatic dispersion (CD) (not considered here), and the Jones matrix of the kth subcarrier $H_k$ is already introduced in Equation (1). The transmitted/received symbols are complex-valued, with the real part corresponding to the in-phase coordinate and the imaginary part corresponding to the quadrature coordinate.

Referring back to FIGS. 1-5, a polarization interference cancellation scheme is shown based on the V-BLAST algorithm, which uses an LDPC code as a channel code. The bit streams originating from m different information sources are encoded by the LDPC encoders 105 using different $(n,k_i)$ LDPC codes of code rate $r_i=k_i/n$, where $k_i$ denotes the number of information bits of the ith (i=1, 2, ..., m) component LDPC code, and n denotes the codeword length, which is the same for all LDPC codes. The use of different LDPC codes allows us to optimally allocate the code rates. The bit-interleaved coded modulation (BICM) scheme can be considered as a special multilevel coding (MLC) scheme in which all of the component codes are of the same rate. The outputs of in LDPC encoders 105 are written row-wise into the block-interleaver 110. The mapper 115 accepts m bits at time instance i from the (m×n) interleaver 110 column-wise and determines the corresponding M-ary ($M=2^m$) signal constellation point $\phi_{I,i},\phi_{Q,i}$ in a two-dimensional (2D) constellation diagram such as M-ary PSK or M-ary QAM. The coordinates correspond to the in-phase and quadrature components of an M-ary constellation. The 2D signal constellation points are split into two streams for OFDM transmitters 200 corresponding to the x- and y-polarizations. The QAM constellation points are considered to be the values of the fast Fourier transform (FFT) of a multi-carrier OFDM signal. The OFDM symbol is generated as follows: $N_{QAM}$ input QAM symbols are zero-padded to obtain $N_{FFT}$ input samples for inverse FFT (IFFT) by the IFFT module 210, $N_G$ non-zero samples are inserted by the cyclic extension insertion module 215 to create the guard interval, and the OFDM symbol is multiplied by the window function. For efficient chromatic dispersion and PMD compensation, the length of cyclically extended guard interval should be longer than the total spread due to chromatic dispersion and DGD. The cyclic extension performed by the cyclic extension insertion module 215 is accomplished by repeating the last $N_G/2$ samples of the effective OFDM symbol part (NFFR samples) as a prefix, and repeating the first $N_G/2$ samples as a suffix. After D/A conversion by the DACs 220 and 225, the RF OFDM signal is converted into the optical domain using the dual-drive Mach-Zehnder modulator (MZM). Two MZMs 135 and 140 are needed, one for each polarization. The outputs of the MZMs 135 and 140 are combined using the PBC 145. One DFB laser 125 is used as a CW source, with the x- and y-polarizations separated by the PBS 130.

On the receiver side, in polarization-time (PT)-coded OFDM, we have the option to use only one polarization or to use both polarizations. The polarization diversity OFDM, and polarization interference cancellation schemes proposed here require the use of both polarizations. The receiver architecture employing both polarizations is shown in FIG. 3. The received OFDM symbol vectors of the kth subcarrier in ith OFDM symbol can be written as follows:

$$r_{i,k} = H_k s_{i,k} e^{j[\phi_{CD}(k) + \phi_\Gamma - \phi_{LO}]} + n_{i,k}$$

where the Jones (channel) matrix $H_k$ corresponding to the kth subcarrier is already introduced in Equation (1), and $r_{i,k} = [r_{x,i,k} r_{y,i,k}]^T$ denotes the received symbol vector of the kth subcarrier in the ith OFDM symbol, while $n_{i,k} = [n_{x,i,k} n_{y,i,k}]^T$ is the corresponding ASE noise vector. We use $s_{i,k} = [s_{x,i,k} s_{y,i,k}]^T$ to denote the symbol transmitted in the kth subcarrier of the ith OFDM symbol in both polarizations.

Figure 8A:
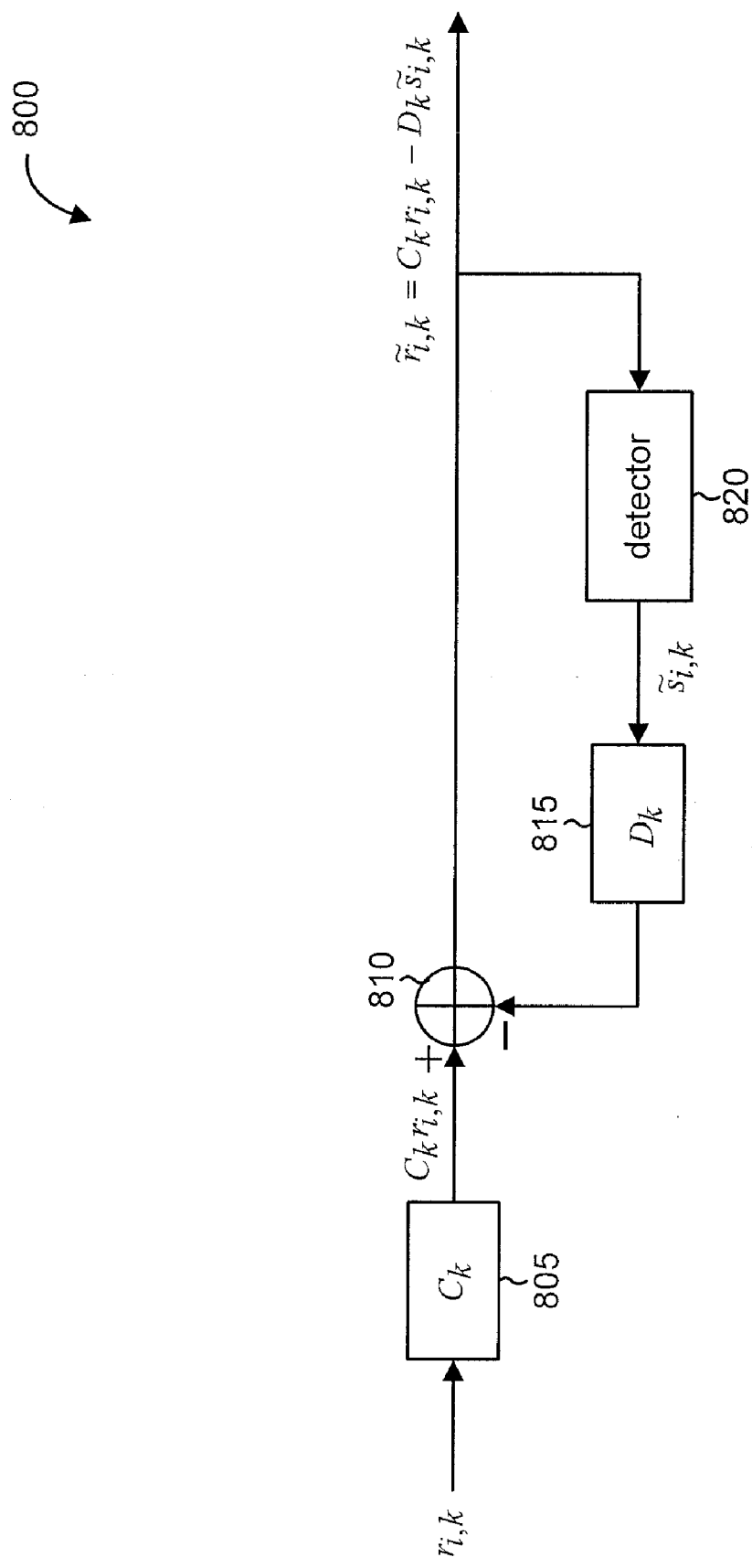
FIG. 8A is a block diagram showing a polarization interference cancellation scheme using the BLAST-algorithm in accordance with an embodiment of the present principles.
Figure 8B:
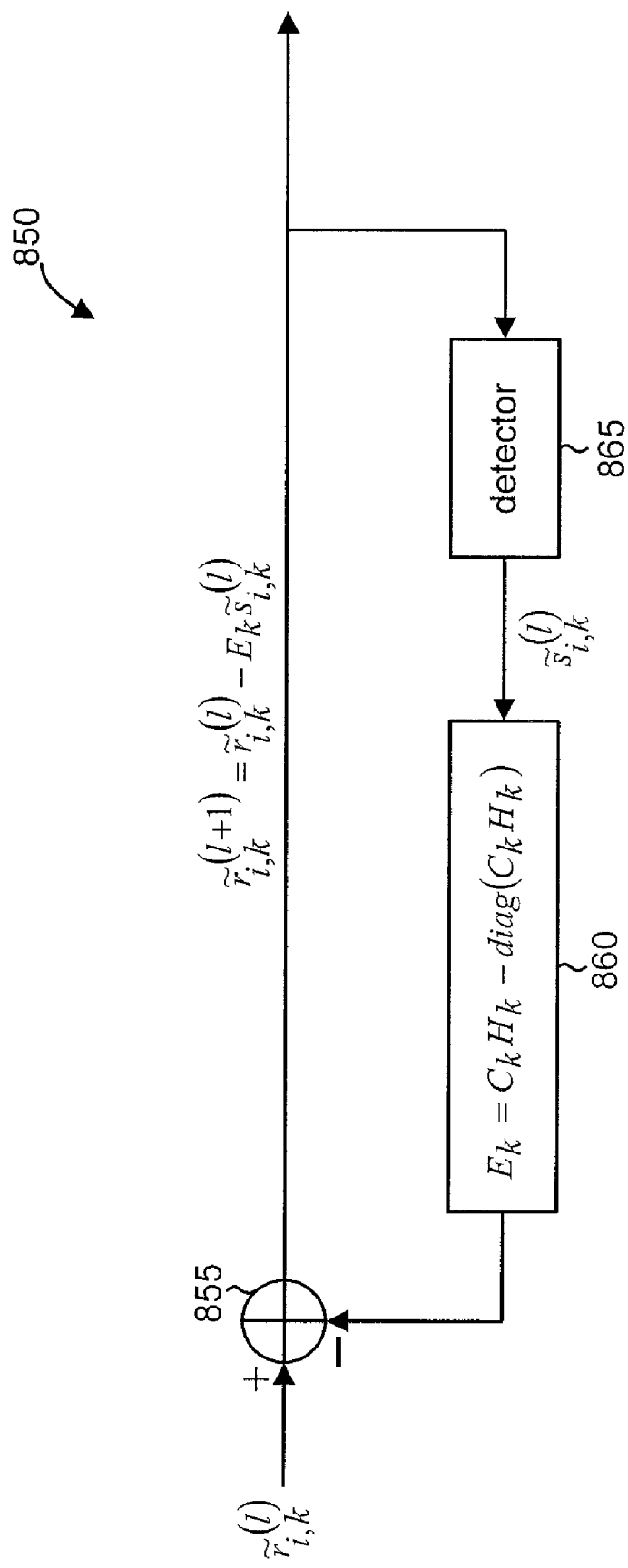
FIG. 8B is a block diagram showing an interactive polarization cancellation scheme in accordance with an embodiment of the present principles.

FIG. 8A shows a polarization interference cancellation scheme 800 using the BLAST-algorithm. The received symbol vector in the kth subcarrier of the ith OFDM symbol in both polarizations (see Equation (3)) is linearly processed. The processing is described by matrix $C_k$, also denoted by the reference numeral 805, related to channel matrix $H_k$ (see Equation (1)). The estimate of polarization interference obtained from preliminary decisions $\tilde{s}_{i,k}$, denoted as $D_k \tilde{s}_{i,k}$, is removed from the received symbol $r_{i,k}$. A Euclidean detector 820 can be used to create the preliminary decisions. When the presence of ASE is ignored, the zero-forcing V-BLAST polarization interference cancellation scheme results. The matrices $C_k$ and $D_k$, the latter also denoted by the reference numeral 815, can be determined from QR-factorization of channel matrix $H_k = Q_k R_k$, as follows:

$$C_k = \text{diag}^{-1}(R_k) Q_k^\dagger, \quad D_k = \text{diag}^{-1}(R_k) R_k - I, \quad (3)$$

where I is an identity matrix, and diag( ) denotes the diagonal elements of $R_k$. Notice that elements at the main diagonal in $D_k$ are zero in order to have only polarization interference being removed. We use † to denote the simultaneous transposition and complex-conjugation. In the presence of ASE noise, the matrices $C_k$ and $D_k$ can be determined by minimizing the MSE, which leads to the following:

$$C_k = \text{diag}^{-1}(S_k)(S_k^\dagger)^{-1} H_k, \quad D_k = \text{diag}^{-1}(S_k) S_k - I \quad (4)$$

where $S_k$ is the upper triangular matrix obtained by the Cholesky factorization of $H_k H_k + I/SNR = S_k^\dagger S_k$, where SNR denotes the corresponding electrical signal to noise ratio (SNR). The derivation of Equations (3) and (4) is equivalent to that for wireless communications, and as such is omitted here. Because the ZF V-BLAST is derived by ignoring the influence of ASE noise, we propose to use ZF V-BLAST as a starting point, and perform the polarization interference cancellation in an iterative fashion as shown in FIG. 8B. That is, FIG. 8B shows an interactive polarization cancellation scheme 850 in accordance with an embodiment of the present principles. The scheme 850 involves a combiner 855, a detector 865, and a matrix $E_k$ (also denoted by the reference numeral 860. If $\tilde{r}_{i,k}^{(l)}$ denotes the processed received symbol of the kth subcarrier in the ith OFDM symbol (for both polarizations) in the lth iteration, then the corresponding received symbol in the (l+1)th iteration can be found by the following:

$$\tilde{r}_{i,k}^{(l+1)} = \tilde{r}_{i,k}^{(l)} - [C_k H_k - \text{diag}(C_k H_k)] \tilde{s}_{i,k}^{(l)}, \quad (5)$$

where $\tilde{s}_{i,k}^{(l)}$ denotes the transmitted symbol (of the kth subcarrier in the ith OFDM symbol (for both polarizations)) estimate in the lth iteration. The matrices $C_k$ and $D_k$ are already introduced in Equation (4). Notice that different matrix operations applied in Equations (3)-(5) are trivial because the dimensionality of the matrices is small, i.e., 2×2.

The BLAST-detector 325 determines soft estimates of symbols carried by the kth subcarrier in the ith OFDM symbol $s_{i,k,x(y)}$, which are forwarded to the a posteriori probability (APP) demapper 330, which determines the symbol log-likelihood ratios (LLRs) $\lambda(q)$ ($q = 0, 1, \ldots, 2^b - 1$) of x- (y-) polarization by the following:

$$\lambda_{x(y)}(q) = -\frac{(\text{Re}[\tilde{s}_{i,k,x(y)}] - \text{Re}[QAM(map(q))])^2}{2\sigma^2} - \frac{(\text{Im}[\tilde{s}_{i,k,x(y)}] - \text{Im}[QAM(map(q))])^2}{2\sigma^2}; q = 0, 1, \ldots, 2^b - 1 \quad (6)$$

where Re[ ] and Im[ ] denote the real and imaginary part of a complex number, QAM denotes the QAM-constellation diagram, $\sigma^2$ denotes the variance of an equivalent Gaussian noise process originating from ASE noise, map(q) denotes a corresponding mapping rule (as an example, Gray mapping is applied here), and b denotes the number of bits per constellation point. Let us denote by $v_{j,x(y)}$ the jth bit in an observed symbol q binary representation $v = (v_1, v_2, \ldots, v_b)$ for x- (y-polarization). The bit LLRs needed for LDPC decoding are calculated by bit LLRs calculation module 335 from the symbol LLRs (provided by the APP demapper 335) using the following:

$$L(\hat{v}_{j,x(y)}) = \log \frac{\sum_{q:v_j = 0} \exp[\lambda_{x(y)}(q)]}{\sum_{q:v_j = 1} \exp[\lambda_{x(y)}(q)]}. \quad (7)$$

Therefore, the jth bit reliability is calculated as the logarithm of the ratio of a probability that $v_j = 0$ and a probability that $v_j = 1$. In the nominator, the summation is done over all symbols q having 0 at the position j, while in the denominator over all symbols q having 1 at the position j. The extrinsic LLRs are iterated backward and forward until convergence or a predetermined number of iterations has been reached. The LDPC code used herein belong to the class of quasi-cyclic (array) codes of large girth ($g \geq 10$), so that the corresponding decoder complexity is low compared to random LDPC codes, and do not exhibit the error floor phenomena in the region of interest in fiber-optics communications ($\leq 10^{-15}$).

A description will now be given regarding the evaluation of proposed PMD compensators in accordance with an embodiment of the present principles.

Thus, we propose two alternative PMD compensation schemes to turbo equalization, channel equalization schemes, polarization diversity OFDM, and PT-coding based OFDM suitable for use in multilevel ($M \geq 2$) block-coded modulation schemes with coherent detection. In contrast to the PMD turbo equalization scheme whose complexity grows exponentially as DGD increases, the complexity of the proposed schemes stays the same. The spectral efficiency of the proposed schemes is two times higher than that of polarization diversity OFDM and PT-coding based OFDM. The first scheme is based on MMSE V-BLAST algorithm, which is used in MIMO wireless communications to deal with spatial interference. The second scheme is based on iterative polarization interference cancellation. Those two schemes perform comparable, and are able to compensate up to 1200 ps of DGD with negligible penalty. When used in combination with girth-10 LDPC codes, those schemes outperform PT-coding based OFDM by 1 dB at BER of $10^{-9}$.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A receiver, comprising:
    a vertical Bell Laboratories Layered Space-Time Architecture (V-BLAST) orthogonal frequency division multiplexing (OFDM) detector configured to receive input sequences and partially cancel polarization interference with respect to the input sequences to output symbol estimates for the input sequences, further including:
    performing a QR-factorization of Jones channel matrix $H_k=Q_k R_k$ and matrices $C_k$ and $D_k$, where $C_k=\mathrm{diag}^{-1}(R_k)Q_k^\dagger$, and $D_k=\mathrm{diag}^{-1}(R_k)R_k-I$;
    removing estimated polarization interference from a received symbol vector $\tilde{r}_{i,k}=C_k r_{i,k}-D_k \tilde{s}_{i,k}$; and
    in an OFDM with coherent detection, representing a received symbol vector of the k th subcarrier in the ith OFDM symbol $r_{i,k}=[r_{x,i,k} r_{y,i,k}]^T$ by:
    $r_{i,k}=H_k s_{i,k} e^{j[\phi_{CD}(k)+\phi_T-\phi_{LO}]}+n_{i,k}$,
    where $s_{i,k}=[s_{x,i,k} s_{y,i,k}]^T$ denotes a transmitted symbol vector of k-th subcarrier in ith OFDM symbol, $n_{i,k}=[n_{x,i,k} n_{y,i,k}]^T$ denotes a noise vector dominantly determined by amplified spontaneous emission (ASE) noise; $\phi_T$ and $\phi_{LO}$ respectively denote laser phase noise processes of transmitting and local lasers, $\phi_{CD}(k)$ denotes the phase distortion of the k th subcarrier due to chromatic dispersion (CD) (not considered here), and the Jones channel matrix $H_k$;
    one or more low-density parity-check (LDPC) decoders coupled to said V-BLAST OFDM detector though the a posteriori probability (APP) demapper, configured to receive channel bit reliabilities and output code words, the channel bit reliabilities being indirectly calculated from the symbol estimates in APP demapper and bit log-likelihood ratios (LLRs) calculator, the one or more LDPC decoders iteratively providing soft estimates to said APP demapper to improve the overall receiver performance.

2. The receiver of claim 1, wherein said V-BLAST OFDM detector utilizes at least one of a zero-forcing (ZF) V-BLAST algorithm and a minimum-mean-square-error (MMSE) V-BLAST algorithm.

3. The receiver of claim 2, wherein an output at least one of the ZF V-Blast algorithm and the MMSE V-BLAST algorithm is initially used to reduce polarization interference, and wherein remaining polarization interference is iteratively reduced using an iterative polarization interference cancelation (IPIC) approach.

4. The receiver of claim 1, further comprising:
    an APP demapper coupled to said V-BLAST OFDM detector configured to receive the symbol estimates and calculate symbol reliabilities there from; and
    a bit reliability module coupled to said APP demapper configured to receive the symbol reliabilities and calculate the channel bit reliabilities there from.

5. The receiver of claim 1, wherein the symbol estimates are obtained using an iterative polarization interference cancelation (IPIC) approach or at least one of a zero-forcing (ZF) V-BLAST algorithm and a minimum-mean-square-error (MMSE) V-BLAST algorithm.

6. The receiver of claim 1, wherein said V-BLAST OFDM detector partially cancels the polarization interference by determining Jones matrix coefficients of a Jones channel matrix for sub-carriers of the input sequences, determining a first matrix $C_k$ and a second matrix $D_k$ by performing a QR-factorization of the Jones channel matrix, estimating a polarization interference on a symbol level based on the first matrix $C_k$ and the second matrix $D_k$, and removing the estimated polarization interference from corresponding symbol representations to obtain symbol estimates.

7. The receiver of claim 6, wherein amplified spontaneous emission (ASE) noise enhancement effect of ZF polarization crosstalk canceller is reduced by minimizing minimum-mean-square-error (MMSE) when determining the first matrix $C_k$ and the second matrix $D_k$.

8. The receiver of claim 1, wherein said V-BLAST OFDM detector partially cancels the polarization interference by determining Jones matrix coefficients of a Jones channel matrix for sub-carriers of the input sequences, determining a first matrix $C_k$ and a second matrix $D_k$ by performing a Cholesky-factorization of the Jones channel matrix, estimating a polarization interference on a symbol level based on the first matrix $C_k$ and the second matrix $D_k$, and removing the estimated polarization interference from corresponding symbol representations to obtain symbol estimates.

9. The receiver of claim 1, further comprising a coherent detector coupled to said V-BLAST OFDM detector for initially detecting an input signal that includes the input sequences.

10. A receiver, comprising:
    an iterative detector configured to receive input sequences and iteratively and partially cancel polarization crosstalk with respect to the input sequences to output symbol estimates for the input sequences; and
    one or more low-density parity-check (LDPC) decoders coupled to said iterative detector configured to receive provisional symbol estimates from said iterative detector, calculate symbol LLRs in APP demapper, claulate bit LLRs in bit reliability calculator, and output code words upon decoding, the channel bit reliabilities being indirectly calculated from the symbol estimates in APP demapper and bit reliability calculator, the one or more LDPC decoders iteratively providing soft information feedback to said APP demapper to improve overall performance.

11. The receiver of claim 10, wherein said iterative detector partially cancels the polarization interference by determining Jones matrix coefficients of a Jones channel matrix for sub-carriers of the input sequences, determining a first matrix $C_k$ and a second matrix $D_k$ by performing a Cholesky-factorization of the Jones channel matrix, determining a third matrix $E_k$ based on at least the first matrix $C_k$ and the Jones channel matrix, estimating a polarization interference on a symbol level based on the third matrix $E_k$, and iteratively removing the estimated polarization interference from corresponding symbol representations to obtain symbol estimates.

12. The receiver of claim 10, further comprising:
   a demapper coupled to said iterative detector configured to receive the symbol estimates and calculate symbol reliabilities there from; and
   a bit probabilities module coupled to said demapper configured to receive the symbol reliabilities and calculate the channel bit reliabilities there from.

13. The receiver of claim 10, wherein the symbol estimates are obtained using an iterative polarization interference cancelation (IPIC) approach or at least one of a zero-forcing (ZF) V-BLAST algorithm and a minimum-mean-square-error (MMSE) V-BLAST algorithm.

14. The receiver of claim 10, further comprising a coherent detector coupled to said iterative detector for initially detecting an input signal that includes the input sequences.

15. A method, comprising:
   receiving and sampling an input signal using a sampler;
   partially cancelling polarization interference using a vertical Bell Laboratories Layered Space-Time Architecture (V-BLAST) orthogonal frequency division multiplexing (OFDM) detector configured to receive channel samples of the input signal and provide symbol estimates for APP demapper; claulate symbol LLRs in APP demapper; calculate bit LLRs in bit reliability calculator, further including:
   performing a QR-factorization of Jones channel matrix $H_k=Q_kR_k$ and matrices $C_k$ and $D_k$ where $C_k=\text{diag}^{-1}(R_k)Q_k^\dagger$, and $D_k=\text{diag}^{-1}(R_k)R_k-I$;
   removing estimated polarization interference from a received symbol vector $\tilde{r}_{i,k}=C_r r_{i,k}-D_k\tilde{s}_{i,k}$; and
   in an OFDM with coherent detection, representing a received symbol vector of the kth subcarrier in the ith OFDM symbol $r_{i,k}=[r_{x,i,k} r_{y,i,k}]^T$ by:
   $r_{i,k}=H_k s_{i,k}e^{j[\phi_{CD}(k)+\phi_T-\phi_{LO}]}+n_{i,k}$,
   where $s_{i,k}=[s_{x,i,k} s_{y,i,k}]^T$ denotes a transmitted symbol vector of k-th subcarrier in ith OFDM symbol, $n_{i,k}=[n_{x,i,k} n_{y,i,k}]^T$ denotes a noise vector dominantly determined by amplified spontaneous emission (ASE) noise; $\phi_T$ and $\phi_{LO}$ respectively denote laser phase noise processes of transmitting and local lasers, $\phi_{CD}$ (k) denotes the phase distortion of the kth subcarrier due to chromatic dispersion (CD) (not considered here), and the Jones channel matrix $H_k$; and
   decoding the input signal based on channel bit reliabilities to output code words using one or more low-density parity-check (LDPC) decoders, the channel bit reliabilities being indirectly calculated from the symbol estimates; and
   iteratively feeding back extrinsic soft information to said APP demapper.

16. The method of claim 15, wherein said V-BLAST OFDM detector utilizes at least one of a zero-forcing (ZF) V-BLAST algorithm and a minimum-mean-square-error (MMSE) V-BLAST algorithm.

17. The method of claim 16, wherein an output at least one of the ZF V-Blast algorithm and the MMSE V-BLAST algorithm is initially used to reduce polarization interference, and wherein remaining polarization interference is iteratively reduced using an iterative polarization interference cancelation (IPIC) approach.

18. The method of claim 15, further comprising:
   receiving the symbol estimates and calculating symbol reliabilities there from; and
   receiving the symbol reliabilities and calculating the channel bit reliabilities there from.

19. The method of claim 15, wherein the symbol estimates are obtained using an iterative polarization interference cancelation (IPIC) approach or at least one of a zero-forcing (ZF) V-BLAST algorithm and a minimum-mean-square-error (MMSE) V-BLAST algorithm.

20. The method of claim 15, wherein said V-BLAST OFDM detector partially cancels the polarization interference by determining Jones matrix coefficients of a Jones channel matrix for sub-carriers of the input sequences, determining a first matrix $C_k$ and a second matrix $D_k$ by performing a QR-factorization of the Jones channel matrix, estimating a polarization interference on a symbol level based on the first matrix $C_k$ and the second matrix $D_k$, and removing the estimated polarization interference from corresponding symbol representations to obtain symbol estimates.

21. The method of claim 20, wherein amplified spontaneous emission (ASE) noise enhancement effect of ZF polarization crosstalk canceller is reduced by minimizing minimum-mean-square-error (MMSE) when determining the first matrix $C_k$ and the second matrix $D_k$.

22. The method of claim 15, wherein said V-BLAST OFDM detector partially cancels the polarization interference by determining Jones matrix coefficients of a Jones channel matrix for sub-carriers of the input sequences, determining a first matrix $C_k$ and a second matrix $D_k$ by performing a Cholesky-factorization of the Jones channel matrix, estimating a polarization interference on a symbol level based on the first matrix $C_k$ and the second matrix $D_k$, and removing the estimated polarization interference from corresponding symbol representations to obtain symbol estimates.

23. The method of claim 15, further comprising initially detecting the input signal using a coherent detector.

24. A method, comprising:
   receiving and sampling an input signal using a sampler;
   partially cancelling polarization interference using an iterative detector configured to receive channel samples of the input signal and provide symbol estimates further including:
   performing a QR-factorization of Jones channel matrix $H_k=Q_kR_k$ and matrices $C_k$ and $D_k$ where $C_k=\text{diag}^{-1}(R_k)Q_k^\dagger$, and $D_k=\text{diag}^{-1}(R_k)R_k-I$;
   removing estimated polarization interference from a received symbol vector $\tilde{r}_{i,k}=C_k r_{i,k}-D_k\tilde{s}_{i,k}$; and
   in an OFDM with coherent detection, representing a received symbol vector of the kth subcarrier in the ith OFDM symbol $r_{i,k}=[r_{x,i,k} r_{y,i,k}]^T$ by:
   $r_{i,k}=H_k s_{i,k}e^{j[\phi_{CD}(k)+\phi_T-\phi_{LO}]}+n_{i,k}$,
   where $s_{i,k}=[s_{x,i,k} s_{y,i,k}]^T$ denotes a transmitted symbol vector of k-th subcarrier in ith OFDM symbol, $n_{i,k}=[n_{x,i,k} n_{y,i,k}]^T$ denotes a noise vector dominantly determined by amplified spontaneous emission (ASE) noise; $\phi_T$ and $\phi_{LO}$ respectively denote laser phase noise processes of transmitting and local lasers, $\phi_{CD}$ (k) denotes the phase distortion of the kth subcarrier due to chromatic dispersion (CD) (not considered here), and the Jones channel matrix $H_k$;
   calculating symbol LLRs in APP demapper;
   calculating bit LLRs in bit reliability calculator; and
   decoding the input signal based on channel bit reliabilities to output code words using one or more low-density parity-check (LDPC) decoders, the channel bit reliabilities being indirectly calculated from the symbol estimates; and
   iteratively feeding back extrinsic soft information to said APP demapper.

25. The method of claim 24, wherein said iterative detector partially cancels the polarization interference by determining Jones matrix coefficients of a Jones channel matrix for subcarriers of the input sequences, determining a first matrix $C_k$ and a second matrix $D_k$ by performing a Cholesky-factorization of the Jones channel matrix, determining a third matrix $E_k$ based on at least the first matrix $C_k$ and the Jones channel matrix, estimating a polarization interference on a symbol level based on the third matrix $E_k$, and iteratively removing the estimated polarization interference from corresponding symbol representations to obtain symbol estimates.

26. The method of claim 24, further comprising:
   receiving the symbol estimates and calculating symbol reliabilities there from; and
   receiving the symbol reliabilities and calculating the channel bit reliabilities there from.

27. The method of claim 24, wherein the symbol estimates are obtained using an iterative polarization interference cancelation (IPIC) approach or at least one of a zero-forcing (ZF) V-BLAST algorithm and a minimum-mean-square-error (MMSE) V-BLAST algorithm.

28. The method of claim 24, further comprising initially detecting the input signal using a coherent detector.

* * * * *